US008169624B2

(12) United States Patent
Torii et al.

(10) Patent No.: US 8,169,624 B2
(45) Date of Patent: May 1, 2012

(54) TRANSMISSIVE DIMENSION MEASURING DEVICE

(75) Inventors: Tomonari Torii, Osaka (JP); Noriyoshi Yamane, Osaka (JP); Ryoichi Tsumori, Osaka (JP); Kentaro Yamazaki, Osaka (JP)

(73) Assignee: Keyence Corporation, Osaka (JP)

( * ) Notice: Subject to any disclaimer, the term of this patent is extended or adjusted under 35 U.S.C. 154(b) by 277 days.

(21) Appl. No.: 12/723,731

(22) Filed: Mar. 15, 2010

(65) Prior Publication Data

US 2010/0271638 A1    Oct. 28, 2010

(30) Foreign Application Priority Data

Apr. 24, 2009    (JP) .................................. 2009-105969

(51) Int. Cl.
*G01B 11/14* (2006.01)
(52) U.S. Cl. ....................................... 356/625; 356/601
(58) Field of Classification Search .................. 356/601, 356/603, 613; 250/559.19, 559.22, 559.24
See application file for complete search history.

(56) References Cited

U.S. PATENT DOCUMENTS

| | | | | | |
|---|---|---|---|---|---|
| 3,566,135 | A | * | 2/1971 | Mouchart | 250/559.15 |
| 3,724,958 | A | * | 4/1973 | Callan | 356/639 |
| 4,120,403 | A | * | 10/1978 | Stephanos | 209/564 |
| 4,192,613 | A | * | 3/1980 | Hammar | 356/639 |
| 5,164,995 | A | * | 11/1992 | Brooks et al. | 382/152 |
| 5,266,810 | A | * | 11/1993 | Murphy | 250/559.24 |
| 5,646,724 | A | * | 7/1997 | Hershline | 356/237.1 |
| 5,815,273 | A | * | 9/1998 | Lisec | 356/600 |
| 6,055,329 | A | * | 4/2000 | Mufti | 382/152 |
| 6,784,415 | B2 | * | 8/2004 | Kudo et al. | 250/221 |
| 7,079,263 | B2 | * | 7/2006 | Sartain et al. | 356/635 |
| 7,126,144 | B2 | * | 10/2006 | De Coi | 250/559.12 |
| 7,684,057 | B2 | * | 3/2010 | Sakai | 356/614 |
| 7,812,970 | B2 | * | 10/2010 | Nygaard | 356/602 |
| 7,920,278 | B2 | * | 4/2011 | Nygaard | 356/638 |
| 2006/0290946 | A1 | * | 12/2006 | Chien | 356/613 |

FOREIGN PATENT DOCUMENTS

| | | |
|---|---|---|
| JP | 06-109432 | 4/1994 |
| JP | 08-247723 | 9/1996 |
| JP | 2008-275462 | 11/2008 |

* cited by examiner

*Primary Examiner* — Roy M Punnoose
(74) *Attorney, Agent, or Firm* — Kilyk & Bowersox, P.L.L.C.

(57) ABSTRACT

There is provided a transmissive dimension measuring device in which a user can intuitively and easily adjust optical axes of a projector and an optical receiver, and in which a suitable action can be immediately taken when contamination is attached to a light projecting surface of the projector and a light receiving surface of the optical receiver. An incident light position display unit provided on the optical receiver expresses a light projecting spot in a pseudo manner by making an LED corresponding to an incident light position turn on, the light projecting spot being incident on the optical receiver arranged with a predetermined interval to the projector which projects light. The incident light position display unit is provided on an upper surface side opposite to a bottom surface that is a surface on which the optical receiver is installed on a base.

9 Claims, 12 Drawing Sheets

F I G. 1
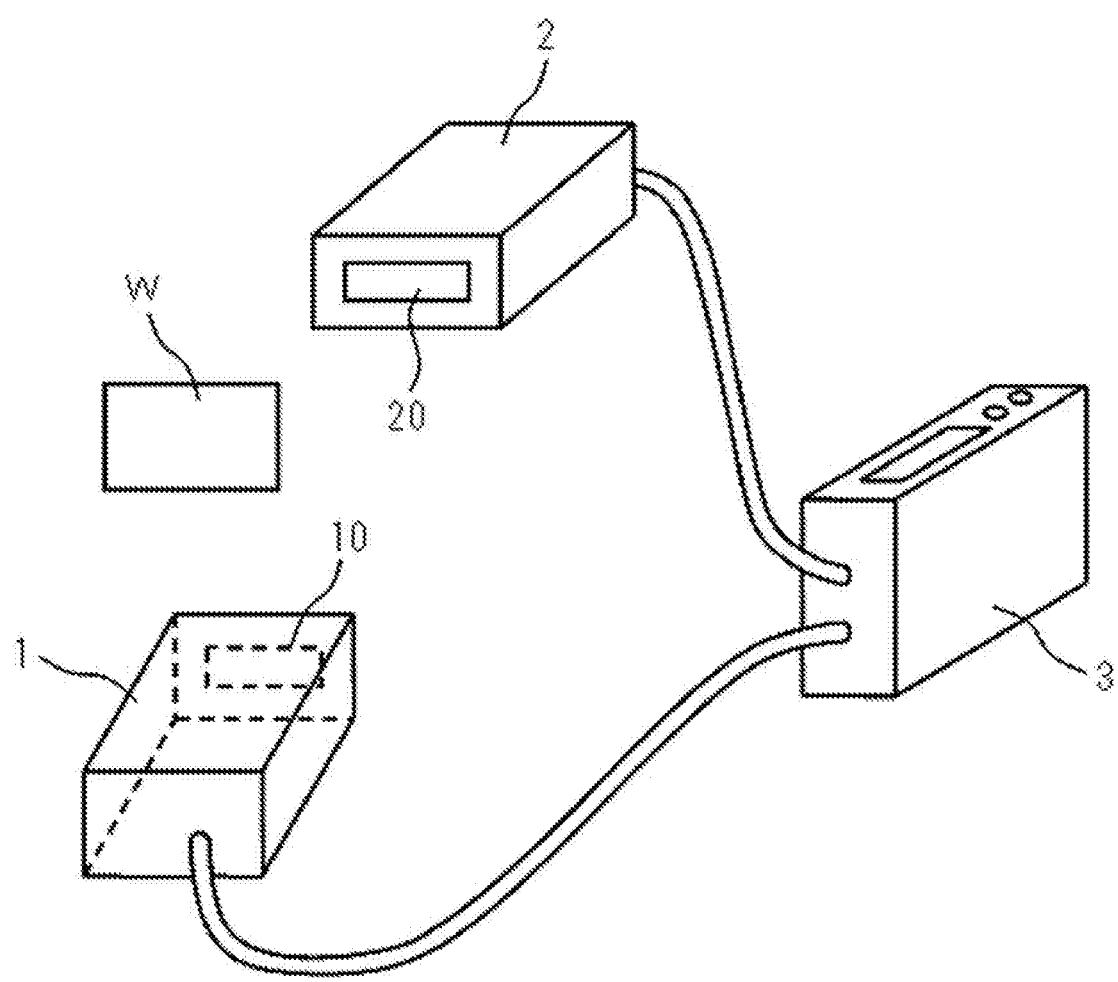

F I G. 1 0
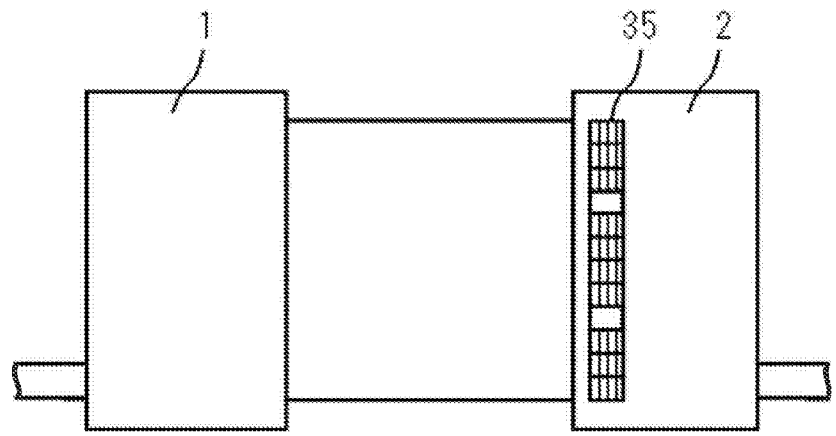
F I G. 1 1
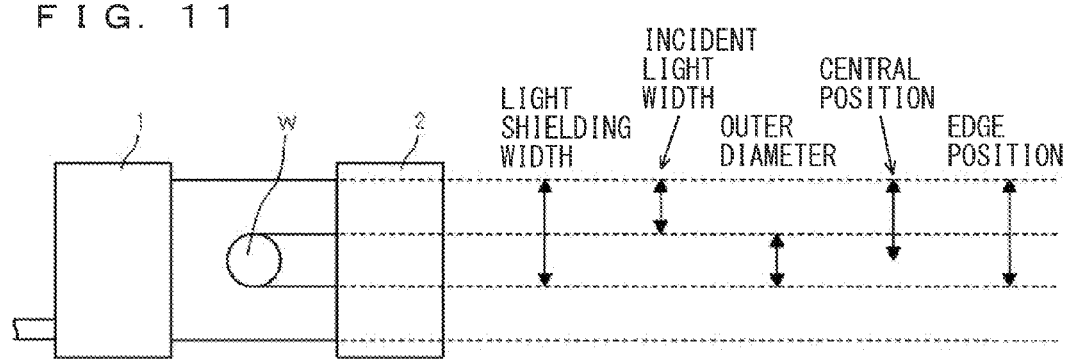
F I G. 1 2
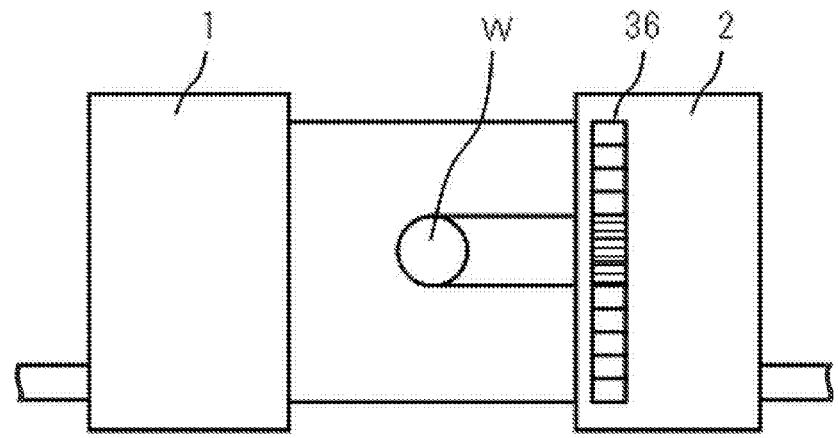

F I G. 19
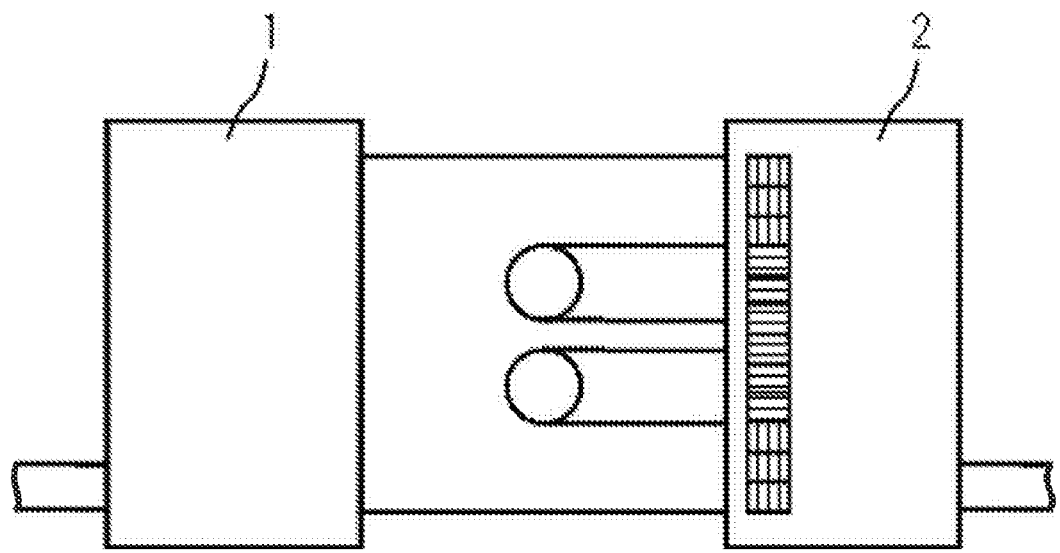

TRANSMISSIVE DIMENSION MEASURING DEVICE

CROSS-REFERENCE TO RELATED APPLICATIONS

The present application claims foreign priority based on Japanese Patent Application No. 2009-105969, filed Apr. 24, 2009, the contents of which is incorporated herein by reference.

BACKGROUND OF THE INVENTION

1. Field of the Invention

The present invention relates to transmissive dimension measuring devices and, more particularly, relates to an optical type transmissive dimension measuring device which detects a change in amount of light by an optical receiver when an object to be measured shields outgoing light from a projector, thereby measuring various kinds of dimensions of the object to be measured.

2. Description of the Related Art

Conventionally, an optical type transmissive dimension measuring device has been used to detect, for example, an outer diameter, position, and interval of an object. The optical type transmissive dimension measuring device includes a projector which projects parallel light to an area to be measured and an optical receiver which receives light transmitted through the area to be measured; and the optical type transmissive dimension measuring device measures a length of shade of the object to be measured, which is generated by shielding the parallel light by the object to be measured and measures various kinds of dimensions of the object to be measured based on an amount of received light received by the optical receiver.

The principle of operation of the optical type dimension measuring devices is largely divided into two methods: a CCD method and a scanning method. In the CCD method, light emitted from a light emitting element is converted to parallel light by a light projecting lens; and the parallel light is radiated to a dimension measuring range. The optical receiver receives light from the dimension measuring range by an incorporated one-dimensional CCD image sensor. When the object to be measured shields the parallel light, shade proportional to the size of a light shielding area is generated at a light receiving unit; and various kinds of dimensions of the object to be measured are calculated based on the size and position of the shade and are outputted.

Furthermore, in the scanning method, light emitted from a light emitting element is deflected by a deflecting element such as a polygon mirror, the deflected light is converted to a parallel light beam by a collimator lens, and is radiated to a dimension measuring range. Light which scans an object to be measured in the dimension measuring range is converged by a light receiving lens in the inside of an optical receiver and is converted to an electrical signal corresponding to light contrasting. An arithmetic operation of the length of time at which shade is generated is performed based on the electrical signal; and accordingly, various kinds of dimensions of the object to be measured are calculated and are outputted. In either of the above methods, a dimension measuring range is defined by the width of the parallel light which is emitted from the projector and is received by the optical receiver.

When a user installs a projector and an optical receiver on a base, the user is required to coincide optical axes of the projector and the optical receiver correctly in a direction perpendicular to and in a direction horizontal to the base.

Conventionally, in order to make the optical axes coincide, the level of coincidence of the optical axes is displayed on a display screen of a controller connected to the projector and the optical receiver or a personal computer (PC) connected to the controller, and the user adjusts the optical axes while watching the display screen (for example, Japanese Unexamined Patent Publication No. 2008-275462).

With the above-described method which confirms the level of coincidence of the optical axes on the PC or on the controller connected to the projector and the optical receiver, the user cannot intuitively comprehend how large or in which direction an optical axis deviation is specifically generated. Furthermore, in the case where the controller and the PC are installed at a position apart from the projector and the optical receiver, work of optical axis adjustment is very inconvenient and, as a result, a large number of working man-hours are inevitably required.

One way to prevent such a problem from occurring is to increase the density of an amount of light which is projected so that a light projecting spot by the projector can be seen by a human eye. However, in the case of the above-described CCD method, the distance between a light source and the light projecting lens needs to be separated to make parallel light with high accuracy; and therefore, the increase in the density of an amount of light has limitations. Furthermore, even in the case of the scanning method, when the density of an amount of light is largely increased to enhance visibility, there arise other problems such as a safety hazard and degradation of life span of the light source. Thus, it is impractical to increase the density of an amount of light to the point where the light projecting spot can be seen by the human eye.

In addition, apart from the above problems, even if the optical axes of the projector and the optical receiver are made to coincide accurately, contamination or the like is sometimes attached to a light projecting surface and a light receiving surface according to a use environment of a user. In the case where contamination or the like is attached to the light projecting surface of the projector and the light receiving surface of the optical receiver, fluctuation of an amount of received light is generated regardless of a state where an object to be measured is not present; and therefore, there is a problem in that accidental erroneous measurement could occur and it is difficult for the user to understand what has happened. Even if the size of contamination is very small, when an edge due to the contamination which should not be originally present is detected, a measured value is outputted as a value which is far from a dimension value of an actual object to be measured. Moreover, even if the user sees the outputted measured value, the user cannot intuitively determine whether or not the outputted measured value is a dimension value of the actual object to be measured, whether or not contamination is attached to the light projecting surface or the light receiving surface, whether or not there is a problem in the use environment, and the like. Therefore, the light projecting surface of the projector and the light receiving surface of the optical receiver must be cleaned periodically so as to obtain an appropriate dimension measured value.

SUMMARY OF THE INVENTION

The present invention has been made in view of the above-mentioned problem, and an object of the present invention is to provide a transmissive dimension measuring device in which a user can intuitively and easily adjust optical axes of a projector and an optical receiver. Furthermore, another object of the present invention is to provide a transmissive dimension measuring device in which a suitable action can be immediately taken when contamination is attached to a light projecting surface of a projector and a light receiving surface of an optical receiver.

A transmissive dimension measuring device according to the present invention includes: a projector which projects light; and an optical receiver which can be arranged with a predetermined interval to the projector and receives light from the projector. The transmissive dimension measuring device detects an edge position of an object to be measured passing in a dimension measuring range between the projector and the optical receiver and a central position of the object to be measured, thereby measuring dimensions of the object to be measured passing between the projector and the optical receiver based on a change in amount of received light received by the optical receiver. The projector includes a projector housing having a substantially rectangular solid shape (a rectangular solid, a cube, a shape in which a part thereof is deformed or cut, and the like) provided therein with a light emitting element which emits light and a light projecting lens which converts light emitted by the light emitting element to parallel light; and a light projecting slit which has a shape with a predetermined width in a dimension measuring direction as a direction substantially horizontal to a bottom surface of the projector housing (a surface which may be a reference surface when adjusting optical axes, for example, an installation surface when installed on a horizontal surface such as a base and an installation surface when installed on a vertical surface such as a wall surface), from which the parallel light is emitted. The optical receiver includes a substantially rectangular solid shaped optical receiver housing provided therein with a light receiving element which receives light, and a light receiving slit which has a shape with a predetermined width in a dimension measuring direction as a direction substantially horizontal to a bottom surface of the optical receiver housing, on which the parallel light is incident. The transmissive dimension measuring device includes an incident light position display unit which is arranged on at least one side of the projector and the optical receiver in the dimension measuring direction, and displays an incident light position on the optical receiver by a plurality of indicating lamps (for example, lamps in which a plurality of light emitting diodes (LED) are provided as an integrated type or a separated type) each displaying a light receiving state with respect to each area that divides a predetermined width in the dimension measuring direction of the light receiving slit.

With this configuration, a user can adjust a relative position of the projector and the optical receiver while confirming the level of an optical axis coincidence in a direction horizontal to the bottom surface based on an illumination state of an incident light position display unit which expresses a light projecting spot in a pseudo manner. Furthermore, in the case where contamination or the like is attached to the light projecting surface of the projector and the light receiving surface of the optical receiver in measuring and in the case where the optical axes are deviated due to an impact applied to the projector and the optical receiver, it becomes possible to determine a cause of trouble and to immediately take a suitable action based on the illumination state of the incident light position display unit.

In a more detailed aspect, the projector includes a substantially rectangular solid shaped projector housing having an elongated light projecting slit, which has a predetermined width in a direction substantially horizontal to a reference surface, on one side surface vertically arranged in a standing condition from the reference surface to be installed on the base; and inside the projector housing, the projector includes a light emitting element which emits light and a light projecting lens which converts light emitted by the light emitting element to parallel light and emits a belt-like projection light beam to the dimension measuring range via the light projecting slit. As the light emitting element, various types of light emitting element such as a laser diode and an LED can be used. The optical receiver includes a substantially rectangular solid shaped optical receiver housing having an elongated light receiving slit, which has a predetermined width in a direction substantially horizontal to a reference surface, on one side surface vertically arranged in a standing condition from the reference surface to be installed on the base; and inside the optical receiver housing, the optical receiver includes a light receiving element which receives light from a measuring area via the light receiving slit. As the light receiving element, a photodiode, CCD, CMOS, and the like can be used. The incident light position display unit, which includes a plurality of indicating lamps arranged in a line in a longitudinal direction of the light projecting slit or the light receiving slit in response to the dimension measuring direction in the dimension measuring range, is formed on at least any one side on an upper surface side opposite to each reference surface of the projector and the optical receiver; and is configured such that an indicating lamp corresponding to a position on which the projection light beam is incident is turned on or turned off based on output of the light receiving element corresponding to the area in which the dimension measuring range is divided by the number of the indicating lamps.

With this configuration, a user can adjust a relative position of the projector and the optical receiver while confirming the level of an optical axis coincidence in a direction horizontal to the base based on an illumination state of the incident light position display unit which expresses the light projecting spot in a pseudo manner when each reference surface of the projector and the optical receiver is installed on the base. Furthermore, in the case where contamination or the like is attached to the light projecting surface of the projector and the light receiving surface of the optical receiver in measuring and in the case where the optical axes are deviated due to an impact applied to the projector and the optical receiver, it becomes possible to determine the cause of the problem and to immediately take a suitable action based on the illumination state of the incident light position display unit. Further, the incident light position display unit which expresses a light projecting spot in a pseudo manner is provided on an upper surface side opposite to a reference surface that is a surface to be installed on the base when installed on the base; and therefore, the incident light position display unit is always located at a position with good visibility for a user and is visible because the incident light position display unit doses not face the base.

Furthermore, the incident light position display unit may be provided on the upper surface side opposite to the reference surface of the optical receiver and a width in the dimension measuring direction of the incident light position display unit may be configured to be substantially the same as a width in the dimension measuring direction in the dimension measuring range.

Accordingly, the incident light position display unit can express the light projecting spot, which is incident on the light receiving slit, in a pseudo manner.

Furthermore, an operation mode setting unit which accepts settings of a plurality of operation modes for selecting a measuring area to be outputted as a measured value based on an edge position of object to be measured may be further provided and the measured value corresponding to the measuring area corresponding to the operation mode set by the operation mode setting unit may be outputted.

Accordingly, an area desired to be measured by a user can be easily set by switching the operation mode.

Furthermore, a measurement position display unit including a plurality of indicating lamps arranged along with the incident light position display unit may be further included in response to the dimension measuring direction in the dimension measuring range, and the measurement position display unit may be configured so that an indicating lamp corresponding to the measuring area to be outputted as the measured value is turned on in response to the operation mode set by the operation mode setting unit.

Furthermore, the incident light position display unit may be configured so that the indicating lamp corresponding to the measuring area to be outputted as the measured value is turned on in a display mode different from a display mode of the indicating lamp in an incident state of a projection light beam in response to the operation mode set by the operation mode setting unit.

Accordingly, a user can intuitively comprehend dimensions of which measuring area are actually measured; and therefore, it is possible to immediately determine whether or not the currently set operation mode is suitable in order to measure an area desired to be measured by a user. Furthermore, it becomes possible to visually comprehend the measured result as well as a measured value display. Further, a display pattern of the indicating lamp is changed in response to switching of the operation mode; and therefore, it becomes possible to easily select the operation mode which is for measuring the area desired to be measured by the user.

Furthermore, a threshold of the amount of received light received by the light receiving element which is for making each of the indicating lamps of the incident light position display unit turn on may be set higher than a threshold of an amount of received light which is for detecting an edge position serving as a reference of the measured value.

Accordingly, contamination of the light projecting surface or the light receiving surface and a change of a use environment can be confirmed based on a display state of the incident light position display unit before the measured value becomes an abnormal state, and consequently it becomes possible to prevent abnormality of the measured value.

Furthermore, an optical axis adjustment mode setting unit which accepts a setting of an optical axis adjustment mode for making optical axes of the projector and the optical receiver coincide may be further included, and the incident light position display unit may be configured to switch to a display mode for visually checking a peak position of an amount of received light received by the light receiving element when the optical axis adjustment mode is set.

Accordingly, a user can confirm a peak position of a distribution of an amount of received light incident on the light receiving slit, and it becomes possible to further accurately perform optical axis adjustment by adjusting a relative position of the projector and the optical receiver so that the peak position is located at a center of the dimension measuring range.

Furthermore, an optical axis coincidence display unit which shows whether or not all the optical axes in the dimension measuring range of the projector and the optical receiver coincide with at least one of the projector and the optical receiver may be included.

Furthermore, an inclined portion may be formed at least one of a corner portion of an upper surface opposite to the bottom surface of the projector and a front surface formed with the light projecting slit, and a corner portion of an upper surface opposite to the bottom surface of the optical receiver and a front surface formed with the light receiving slit, and the inclined portion may be formed with the incident light position display unit.

Accordingly, a user can visually check the incident light position display unit from the front side of the projector and the optical receiver; and consequently, workability for optical axis adjustment is further improved.

According to a transmissive dimension measuring device of the present invention, a user can intuitively and easily adjust optical axes of a projector and an optical receiver. Furthermore, it becomes possible to immediately take a suitable action when contamination is attached to a light projecting surface of the projector and a light receiving surface of the optical receiver.

BRIEF DESCRIPTION OF THE DRAWINGS

FIG. 1 is a system configuration diagram in a present embodiment;

FIG. 10 is a diagram showing an example of an illumination pattern of an incident light position display unit 35 when contamination is attached to a light projecting surface or a light receiving surface;

FIG. 11 is a diagram for describing a measuring area of each operation mode;

FIG. 12 is a diagram showing an example of an illumination pattern of a measurement position display unit 36;

FIG. 19 is a diagram showing a modified embodiment of a display unit 42.

DETAILED DESCRIPTION OF THE INVENTION

Figure 2:
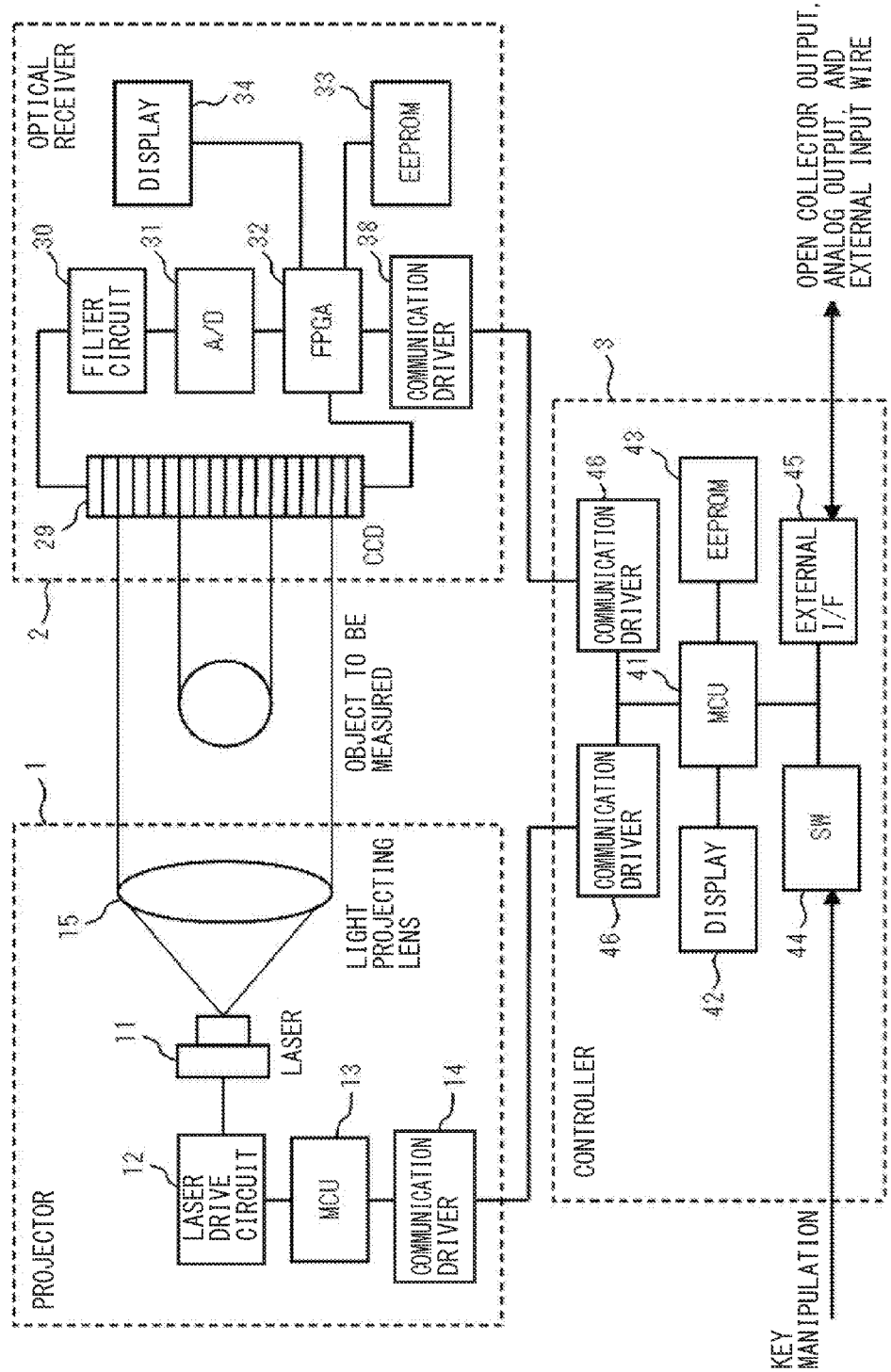
FIG. 2 is a block diagram for describing an internal configuration of a projector 1, an optical receiver 2, and a controller 3 in the present embodiment.

Hereinafter, transmissive dimension measuring devices in embodiments of the present invention will be described in detail with reference to drawings. In the embodiments described below, as an example, a CCD method transmissive dimension measuring device which uses a laser diode (hereinafter, LD) serving as a light projecting unit and a one-dimensional charge coupled device image sensor (hereinafter, CCD) serving as a light receiving element will be described.

FIG. 1 is a system configuration diagram showing a whole system of a transmissive dimension measuring device in the present embodiment. The transmissive dimension measuring device in the present embodiment includes a projector 1 which projects light to an area to be measured, an optical receiver 2 which receives light transmitted through the area to be measured, and a controller 3 which is connected to the projector 1 and the optical receiver 2 and controls the projector 1 and the optical receiver 2. A light projecting slit 10 (light projecting window) serving as a portion which emits light is formed on the projector 1; and a part of light radiated to the area to be measured via the light projecting slit 10 is light-shielded by an object to be measured W passing between the projector 1 and the optical receiver 2. The optical receiver 2 receives light, which is not light-shielded by the object to be measured W, via a light receiving slit 20 (light receiving window).

FIG. 2 is a block diagram for describing the internal configuration of the projector 1, the optical receiver 2, and the controller 3. An LD 11 serving as a light emitting element is incorporated in the projector 1, and laser light emitted from the LD 11 is converted to belt-like parallel light by a light projecting lens 15 and is radiated to the area to be measured. A laser drive circuit 12 which is for driving the LD 11 is connected to the LD 11, and the laser drive circuit 12 is controlled by a micro controller unit (MCU) 13. The optical receiver 2 includes a CCD 29 which receives light from the area to be measured; a filter circuit 30 which performs filtering of an electrical signal received by the CCD 29; an A/D converter 31 which A/D converts the filtered electrical signal; a field programmable gate array (FPGA) 32 which controls a display unit 34 and the CCD 29, and detects an edge position from the A/D converted electrical signal; and an electronically erasable and programmable read only memory (EEPROM) 33 which stores a threshold that is for detecting the edge position and the number of CCD pixels or the like. The controller 3 communicates via the projector 1, the optical receiver 2, and controller communication drivers 46; and includes an MCU 41 which executes various kinds of calculations, a controller display unit 42 which displays calculated dimension values or the like, an external interface (I/F) 45, software (SW) 44 which accepts settings of various operation modes and setting operation of thresholds, and an EEPROM 43 which stores various kinds of setting data. The external I/F 45 includes open collector output, analog output, external input wires, and the like. The present embodiment describes that each of the projector 1 and the optical receiver 2 has a dedicated function; however, a device which has both a function as the projector and a function as the optical receiver of the present embodiment may be used as the projector and the optical receiver.

The MCU 41 of the controller 3 accepts input of various signals from an external device via the external input wires. The MCU 41 periodically transmits a light projecting control signal to the projector 1 and a light receiving control signal to the optical receiver 2 by an internal timer via controller communication drivers 46a and 46b. The MCU 13 of the projector 1 that received the light projecting control signal controls the laser drive circuit 12; and the laser drive circuit 12 drives the LD 11 and radiates parallel light to the area to be measured via the light projecting lens 15 and the light projecting slit 10. On the other hand, the FPGA 32 of the optical receiver 2 drives the CCD 29 in response to the light receiving control signal. The CCD 29 has one-dimensionally arranged plurality of pixels, receives light from the area to be measured via the light receiving slit 20, and transmits an amount of received light of each pixel to the FPGA 32 via the filter circuit 30 and the A/D converter 31.

The FPGA 32 makes a distribution of an amount of received light of the area to be measured formed by a plurality of pixels from the amount of received light of the obtained each pixel and compares the created distribution of the amount of received light with a measuring threshold P1 stored in the EEPROM 33; thereby detecting an edge position which is light-shielded by an object. The detected edge position and information of an amount of received light in proximity thereof are transmitted to the controller 3 via the optical receiver communication driver 38 and the controller communication driver 46. As described above, in the present embodiment, the distribution of the amount of received light received by each pixel of the CCD 29 is not directly transmitted to the controller 3; but, after the edge position is detected by the optical receiver 2, only the edge position and the information of the amount of received light in proximity thereof are transmitted to the controller 3; and accordingly, reduction in communication load and improvement in processing speed are achieved.

As the light receiving element, a CCD image sensor is typically adopted. However, as the light receiving element, a complementary metal oxide semiconductor (CMOS) image sensor can be used in place of the CCD image sensor.

The controller 3 executes various kinds of calculations based on edge position information received from the optical receiver 2. Operation modes set by a user and thresholds of HI/LO for defining a tolerance range are stored in the EEPROM 43. Although the detail of the operation modes will be described later, a plurality of modes which are for selecting various areas desired to be measured by the user, such as a light shielding width, an incident light width, an outer diameter, an inner diameter, and a designated width between edges are prepared. The MCU 41 of the controller 3 calculates a measured value corresponding to an operation mode set from the received edge position information, displays the same on the controller display unit 42, performs OK/NG determination as to whether or not the measured value is within the tolerance range, and outputs a determination result to the outside via the external I/F 45. It should be noted that settings of the above-described operation modes and the thresholds of HI/LO can be changed by the SW 44; and the MCU 41 accepts the setting change and makes the EEPROM 43 store the contents of the change.

As external input of the external I/F 45, other input is available as follows: peak hold input, bottom hold input, bank switching input which collectively switches various settings such as the measuring threshold P1, the HI/LO thresholds, or the operation modes according to application, and timing input which controls a measuring timing.

The FPGA 32 transmits the edge position information to the controller 3 and performs display control of the display unit 34 provided in the optical receiver 1. An incident light display threshold P2 is stored in the EEPROM 33 in addition to the measuring threshold P1; and the obtained distribution of the amount of received light is compared with the incident light display threshold P2. Although the details will be described later, the display unit 34 expresses a pixel position on which light is incident without being light-shielded by the object, that is, a light projecting spot on a light receiving surface in a pseudo manner.

Figure 3:
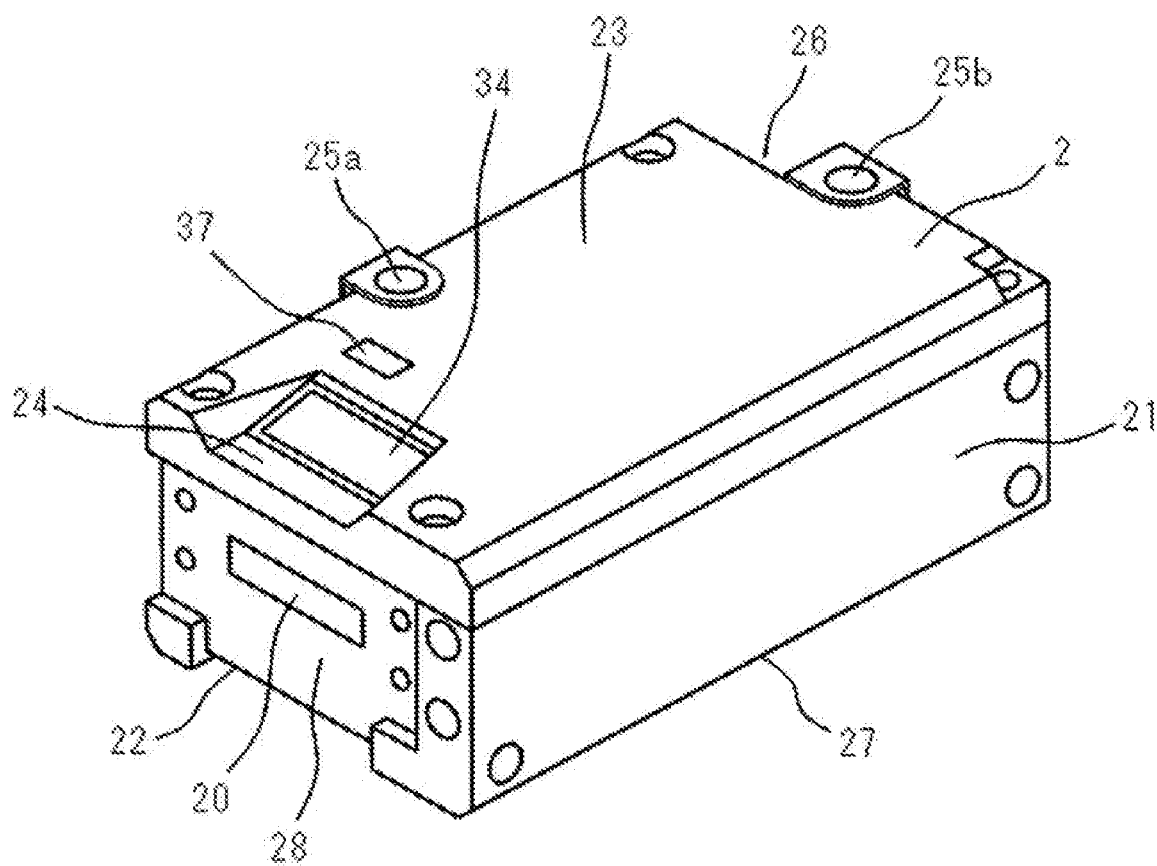
FIG. 3 is an outer appearance perspective view of the optical receiver 2 in the present embodiment.

FIG. 3 is a perspective view showing an outer appearance of an optical receiver 2 provided with the display unit 34. The optical receiver 2 has a substantially rectangular solid shaped casing; and the casing includes a reference surface 27, a lower side casing 21 which covers both side surfaces and a rear surface except for a light receiving surface 28 vertically arranged in a standing condition from the reference surface 27, an upper side casing 23 which covers an upper surface opposite to the reference surface 27, and a front cover 22 having a light receiving slit 20 and configured by the light receiving surface 28 which receives light from the projector 1.

Mounting holes 25a and 25b which are for mounting to a base are provided on the upper side casing 23 and a screw is screwed in each of the mounting holes 25a and 25b to mount the optical receiver 2 on the base. A transparent inclined surface 24 is formed at a corner portion of the upper side casing 23 and the light receiving surface 28, and a display unit 34 that is visible from the outside is formed on the inside of the inclined surface 24. The display unit 34 is provided on the inside of the inclined surface 24; and therefore, the display unit 34 is exposed to both the upper surface side and the light receiving surface side, thereby providing very good visibility for a user. Furthermore, an LED 37 for displaying optical axis coincidence which is for indicating optical axis adjustment completion is provided near the inclined surface 24. The lower side casing 2 is provided with a cable drawing portion 26 on the rear surface side facing the light receiving surface 28. A part of the cable drawing portion 26 is formed by cutting a part of the rear surface; and therefore, even when a cable is bent and drawn, the cable can be drawn without providing unnecessary space on the rear surface side.

Furthermore, the display unit 34 is arranged on the upper surface side opposite to the reference surface 27 to be installed on the base; and therefore, the display unit 34 is not installed behind the base. Optical axes in a direction substantially perpendicular to the base, that is, in a vertical direction, automatically coincide by mounting each reference surface 27 of the projector 1 and the optical receiver 2. After the reference surface 27 is mounted on the horizontal base, a user merely adjusts a relative position of the projector 1 and the optical receiver 2 within a surface horizontal to the base; and accordingly, the optical axes of the projector 1 and the optical receiver 2 can be made to coincide completely with each other. At this time, the display unit 34 is arranged on the upper surface side opposite to the reference surface 27; and therefore, the user can perform optical axis adjustment within the horizontal surface while confirming the display unit 34. When a deformation or the like is generated on the reference surface 27, a vertical optical axis does not correctly coincide even if the reference surface 27 is installed on the base. Thus, in the present embodiment, only the lower side casing 21 having the reference surface 27 is formed by die-casting with high horizontal accuracy; and the upper side casing 23 and the front cover 22 are formed by inexpensive resin. It should be noted that the lower side casing 21 covers both the side surfaces and the rear surface, and it is possible to install any of both side surfaces on the base and to install the optical receiver 2 in a vertically set state.

Figure 4:
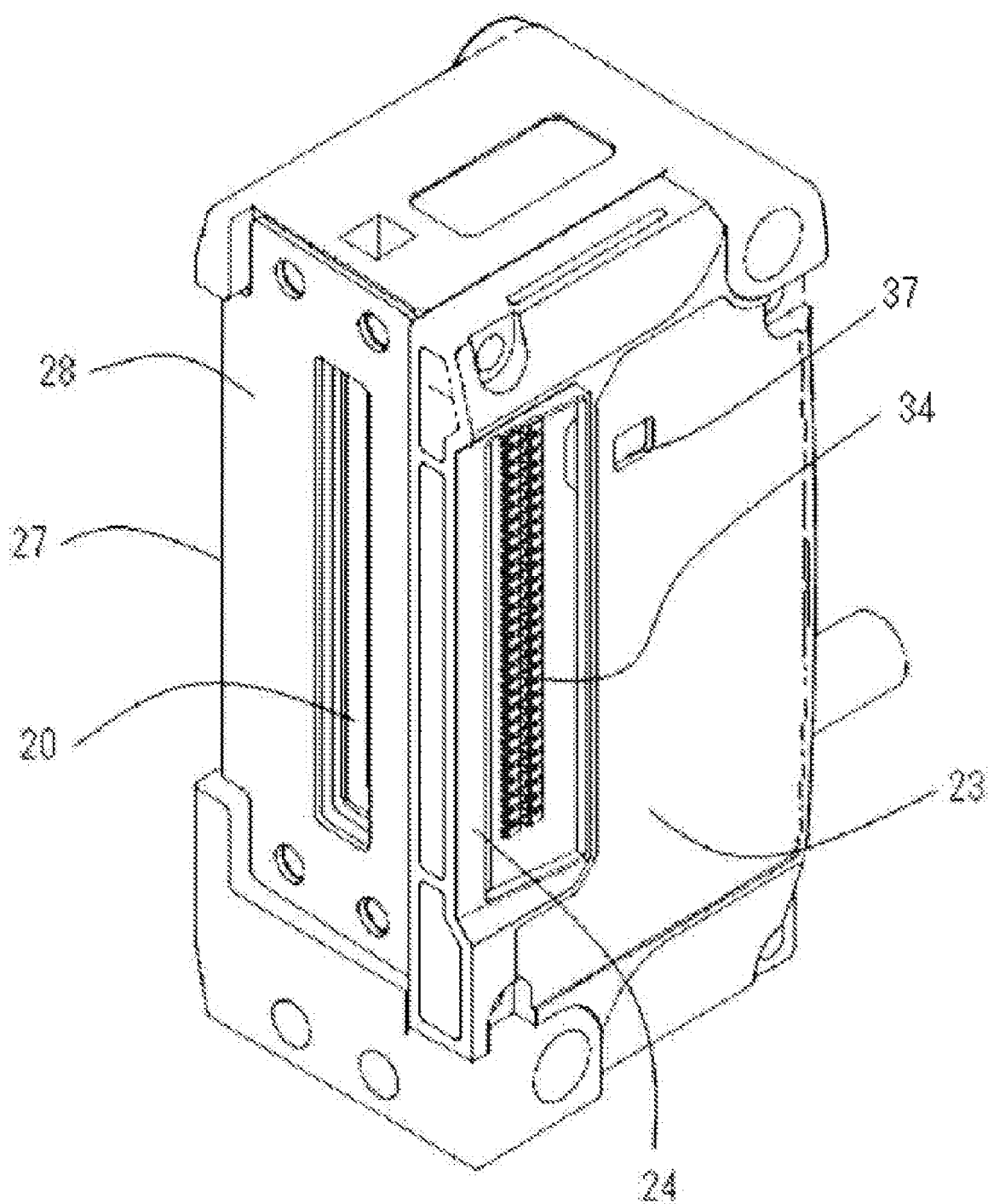
FIG. 4 is another outer appearance perspective view of the optical receiver 2 in the present embodiment.

FIG. 4 is a perspective view showing another outer appearance of an optical receiver 2, and the same reference numerals as those shown in FIG. 3 are given to corresponding parts. A dimension measuring range in the CCD method transmissive dimension measuring device is physically specified by a length in a width direction of a light receiving element incorporated in the optical receiver 2; and an projector 1 which emits parallel light having a width corresponding thereto is adopted. Thus, the optical receiver 2 provided with a wide light receiving slit 20 as shown in FIG. 4 is used when required to ensure a wide dimension measuring range.

Figure 5:
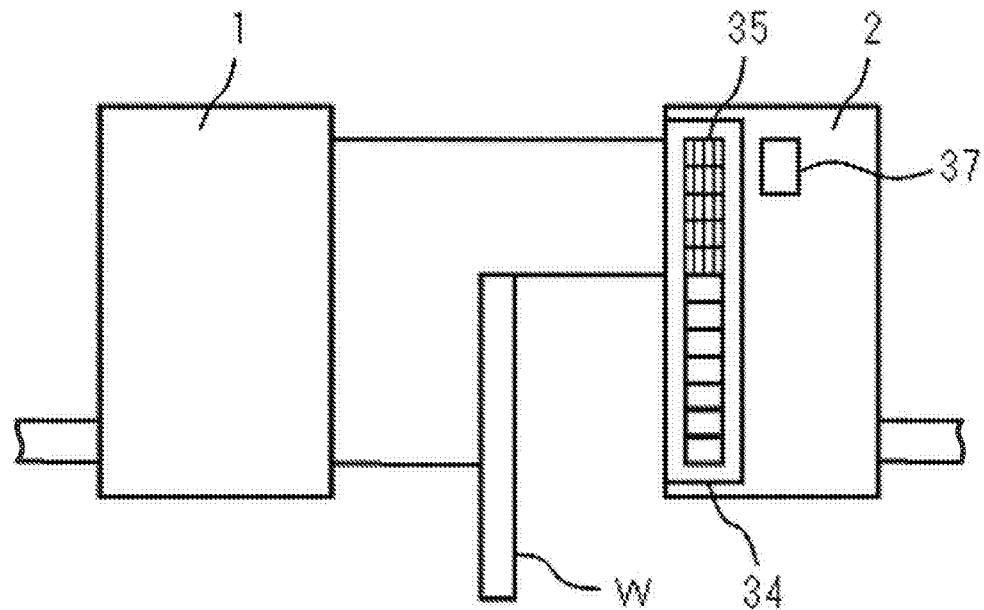
FIG. 5 is a diagram showing an example of an illumination pattern of an incident light position display unit 35 in the present embodiment.

FIG. 5 is a diagram schematically showing a function of the display unit 34 and the LED 37 for displaying optical axis coincidence. The display unit 34 has a length in an arrangement direction of the CCD 29, that is, a length substantially the same as the length in the dimension measuring direction of the dimension measuring range, and includes an incident light position display unit 35 having an arrangement including a plurality of LEDs. The incident light position display unit 35 is arranged on an extension of the dimension measuring range on the upper surface of the optical receiver 2, and expresses a light projecting spot, which is incident on the CCD 29, in a pseudo manner according to an illumination state of each LED constituting the incident light position display unit 35. In the present embodiment, the incident light position display unit 35 has a length substantially the same as the length in the arrangement direction of the CCD 29, but is not necessarily limited thereto; and the incident light position display unit 35 may be enlarged or reduced with respect to the length in the arrangement direction of the CCD 29. Furthermore, the incident light position display unit 35 is not necessarily arranged on the extension of the dimension measuring range; but, in order to express a light projecting spot in a pseudo manner and to make the optical axes coincide intuitively by a user, it is preferable to arrange the incident light position display unit 35 on the extension of the dimension measuring range. Vertical lines drawn in the incident light position display unit 35 show that a corresponding LED is in the illumination state.

Each LED constituting the incident light position display unit 35 is turned on or turned off in response to an amount of received light of a pixel at a position of the CCD 29 corresponding to each LED. More specifically, for example, in the case where the number of LED is 10 and the number of pixels of the CCD 29 is 1000, and if the number of pixels is evenly allocated to each LED, one LED corresponds to 100 pixels. Each LED is allocated by 100 pixels in the pixel arrangement direction of the CCD in order from one end in the arrangement direction of the LED; the FPGA 32 of the optical receiver 2 determines whether or not each of the amount of received light of the 100 pixels exceeds the incident light display threshold P2; and an LED corresponding to the case where the number of the pixels exceeding the P2 is not less than a predetermined number is made to turn on. It should be noted that illumination conditions of the LED is not limited thereto, but an corresponding LED may be made to turn on based on the sum or average of the amount of received light of the pixel. Furthermore, an LED corresponding to a pixel position of the CCD 29 on which light is not incident may be made to turn on, and then only an LED corresponding to a pixel position of the CCD 29 on which light is incident may be made to turn off.

Figure 6:
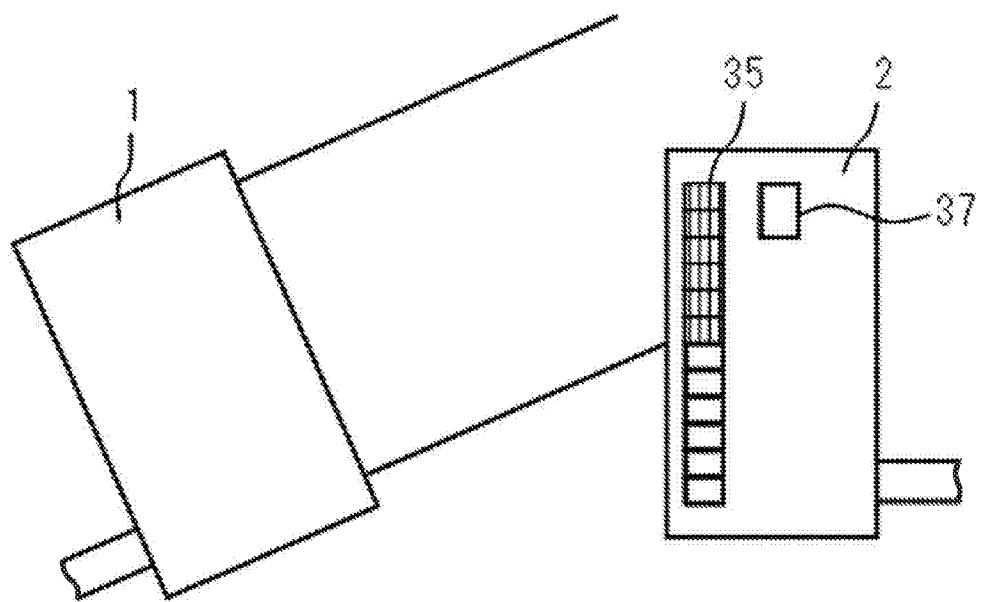
FIG. 6 is a diagram showing an example of an illumination pattern of the incident light position display unit 35 when an optical axis deviation is generated in the present embodiment.

FIG. 6 is a diagram showing an illumination state of the incident light position display unit 35 in the case where optical axes of the projector 1 and the optical receiver 2 are deviated. As shown in FIG. 6, LEDs corresponding to pixel positions of the CCD 29 on which light is not incident due to an optical axis deviation are turned off. Therefore, even when a user cannot see a light projecting spot of the projector 1, it is possible to easily determine which direction and what degree a relative position of the projector 1 and the optical receiver 2 should be adjusted to make the optical axes completely coincide, by confirming an illumination pattern of the LED of the incident light position display unit 35.

Figure 7:
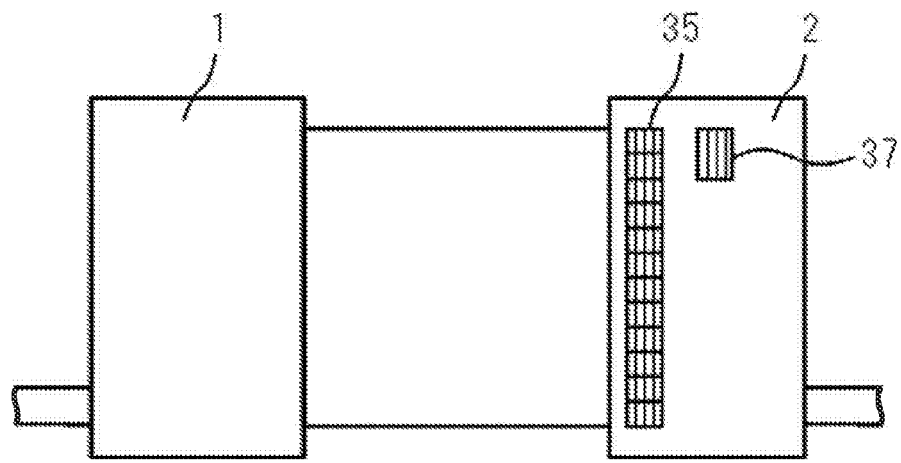
FIG. 7 is a diagram showing an example of an illumination pattern of the incident light position display unit 35 when optical axes completely coincide in the present embodiment.

FIG. 7 is a schematic view showing an illumination state of the incident light position display unit 35 in the case where optical axes of the projector 1 and the optical receiver 2 coincide. When the optical axes of the projector 1 and the optical receiver 2 coincide, all the LEDs of the incident light position display unit 35 are turned on. In addition, when the optical axes coincide in an ideal state, the LED 37 for displaying optical axis coincidence is turned on. Generally, the density of an amount of light of parallel light radiated from the projector 1 is not uniform; the closer the parallel light comes to a central axis, the higher the density of an amount of light is; and the density of an amount of light is gradually lowered as the parallel light is apart from the central axis. Therefore, even if all the LED of the incident light position display unit 35 are turned on and the optical axes seems to completely coincide at first glance; actually, the central axis of the parallel light is slightly deviated and an ideal optical axis coincidence state may not be provided. Thus, the LED 37 for displaying optical axis coincidence is configured to turn on only when an amount of received light of a pixel in which the amount of received light is the minimum in each pixel value of the CCD 29 is not less than a predetermined level. With such a configuration, a user can easily adjust the projector 1 and the optical receiver 2 to be the optimal relative position without confirming external devices at all. It should be noted that illumination conditions of the LED 37 for displaying optical axis coincidence is not limited to the above-mentioned conditions; but may be made to turn on by the sum or average of an amount of received light of all the pixels of the CCD 29, or may be made to turn on automatically in the case where all the LEDs of the incident light position display unit 35 are turned on.

Figure 8:
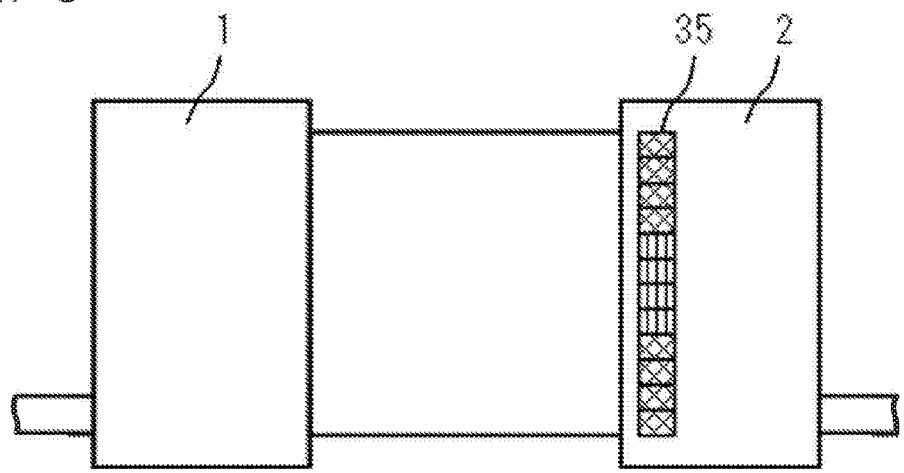
FIG. 8 is a diagram showing a first modified embodiment of an incident light position display unit 35.

FIG. 8 is a diagram showing an illumination state of a modified embodiment of an incident light position display unit 35. In order that a user intuitively recognizes an ideal optical axis coincidence of a projector 1 and an optical receiver 2, a peak position of a distribution of an amount of received light received by a CCD 29 needs to be recognized. In this modified embodiment, among LEDs corresponding to pixels which are in an incident light state and turned on, a color of the LED corresponding to a pixel in which an amount of received light is particularly large is changed. A transmissive dimension measuring device in the present modified embodiment includes a display mode which is for performing optical axis adjustment to realize an optimal optical axis coincidence state; and when being set to this optical axis adjustment mode, an approximate position of a peak position of an amount of received light depending on the LED color is displayed. The user can confirm the peak position of the amount of received light by visually checking the LED color; and therefore, the user can easily realize the optimal optical axis coincidence state. In this modified embodiment, the LED color corresponding to the pixel in which the amount of received light is large is changed; however, the modified embodiment is not limited thereto, but an amount of emitted light or a display mode (blinking or the like) of the LED may be changed.

Furthermore, a display pattern of the incident light position display unit 35 in this modified embodiment is useful for not only in optical axis adjustment, but also in normal measurement. In the case where an amount of irradiated light of the projector 1 is reduced and an amount of received light in which the optical receiver 1 receives due to a change of a use environment, displaying colors and display modes of the incident light position display unit 35 are confirmed; and accordingly, necessary treatments can be carried out before abnormality occurs in a measured value. In addition, in the case where an object to be measured is a transparent body, the color and the amount of light of the LED are changed according to a transmission rate of the object to be measured. Thus, in the case of setting a measuring threshold P1 which is for detecting an edge according to the transmission rate of the object to be measured, the measuring threshold P1 can be set by reference to an illumination pattern of the incident light position display unit 35.

Figure 9:
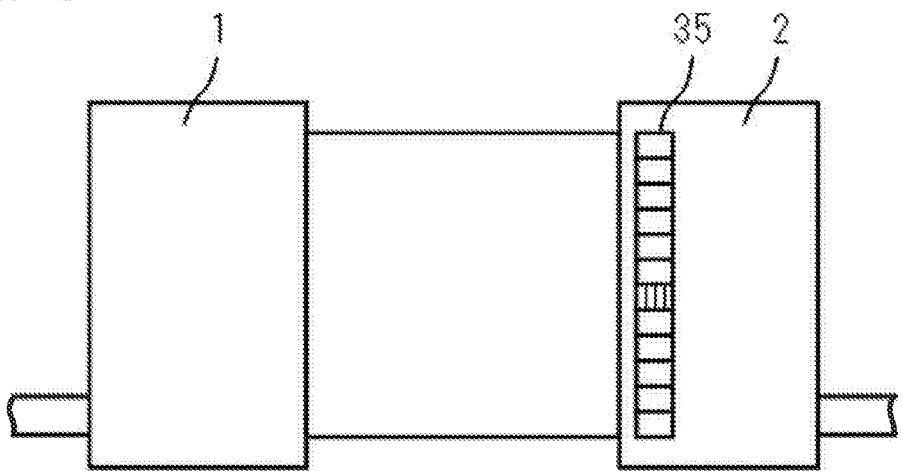
FIG. 9 is a diagram showing a second modified embodiment of an incident light position display unit 35.

FIG. 9 is a diagram showing an illumination state of another modified embodiment of an incident light position display unit 35. In this modified embodiment, only an LED corresponding to a peak position of a distribution of an amount of received light is made to turn on; a relative position of a projector 1 and an optical receiver 2 is adjusted so that the LED to be turned on is located at the center of an LED arrangement; and accordingly, an ideal optical axis coincidence state can be easily realized.

Incidentally, in the transmissive dimension measuring device, when dust and/or dirt is attached to a light projecting surface or a light receiving surface, the dust and/or dirt shields a part of parallel light; and therefore, an edge which should not be originally present is sometimes detected. In this case, a measured value is outputted as a value which is far from a dimension value of an actual object to be measured; and therefore, a user cannot easily determine the cause of abnormality in the measured value. FIG. 10 is a diagram schematically showing a display pattern of the incident light position display unit 35 in the case where contamination is attached to the light projecting surface or the light receiving surface. As shown in FIG. 10, in the case where contamination is attached to the light projecting surface or the light receiving surface, an LED corresponding to a pixel position where the contamination of the incident light position display unit 35 is attached is turned off. Therefore, according to the present embodiment, a user can recognize the presence or absence of the contamination and the position of the contamination based on an illumination pattern of the LED of the incident light position display unit 35 and can immediately perform maintenance.

As described above, in the present embodiment, the display unit 34 is provided on the upper surface side opposite to the reference surface 27 to be installed on the base of the optical receiver 1; and the display unit 34 expresses a light projecting spot, which is radiated by the projector 1 and received by the CCD 29, in a pseudo manner. Therefore, although the light projecting spot is not seen by a human eye, the optical axes of the projector 1 and the optical receiver 2 can be adjusted by an intuitive operation. Furthermore, in order to have an optimal optical axis coincidence state, the LED 37 for displaying optical axis coincidence is provided and completion of optical axis adjustment can be explicitly shown. Further, the light projecting spot is expressed in a pseudo manner and contamination attached to the light projecting surface or the light receiving surface can be visualized; and therefore a user can easily perform maintenance.

Furthermore, the transmissive dimension measuring device of the present embodiment includes a plurality of operation modes which are for setting a measuring area desired to be outputted as a measured value by a user. FIG. 11 is a diagram for describing a plurality of operation modes. In this case, as examples of the operation modes, the following five measurement modes are exemplified: a light shielding width measurement mode, an incident light width measurement mode, an outer diameter measurement mode, a central position measurement mode, and an edge position designation measurement mode.

The light shielding width measurement mode calculates the distance from one end of a dimension measuring range to a final edge position. The incident light width measurement mode calculates the distance from one end of the dimension measuring range to an initial edge position. The outer diameter measurement mode calculates the distance between the initial edge position and the final edge position counted from one end of the dimension measuring range. The central position measurement mode calculates the distance from one end of the dimension measuring range to a central position between the initial edge position and the next edge position. The central position is determined by calculating a midpoint of detected two edge positions. The edge position measurement mode is a mode in which the distance related to the edge position specified by the user is calculated, for example, in the case where two or more light shielding objects are present, the edge position measurement mode can freely set what number of edge position counted from one end of the dimension measuring range is to be measured. FIG. 10 shows an example in which one end of the dimension measuring range and a second edge position are designated. These operation modes can be set and switched by operating the SW 44 provided in the controller 3.

FIG. 12 is a schematic view showing another embodiment of a display unit 34 provided on an optical receiver 2. The display unit 34 is provided with a measurement position display unit 36 in which a plurality of LEDs showing a measuring area corresponding to an operation mode set by a user are arranged in a line. In an example shown in FIG. 12, an outer diameter measurement mode is selected as the operation mode; and the distance between an initial edge position and a second edge position counted from one end of a dimension measuring range is calculated. As shown in FIG. 12, the measurement position display unit 36 turns on only an LED corresponding to a pixel position located in the measuring area that is an actual object to be measured. Therefore, the user can intuitively determine whether or not the currently set operation mode is a desired mode. Furthermore, an illumination pattern of the LEDs constituting the measurement position display unit 36 is changed in response to switching of the operation mode; and therefore, it becomes possible to visually recognize which measured value of the measuring area is outputted by each operation mode.

In this embodiment, the FPGA 32 of the optical receiver 2 shown in FIG. 2 is set by a user and reads operation modes stored in the EEPROM 43 of the controller 3, determines an LED to be turned on in response to the detected edge position and the read operation mode, and controls a display of the measurement position display unit 36. The measurement position display unit 36 is arranged on an extension of the dimension measuring range and has a width substantially the same as a width of the dimension measuring range as in the above-described incident light position display unit 35; and therefore, an approximate value of the measured value can be intuitively taken. Furthermore, a pitch of a plurality of LEDs constituting the measurement position display unit 36 is set to a round figure, for example, 1 mm; and accordingly, it becomes possible to know an outline of the measured value by the number of the turned-on LEDs.

Figure 13:
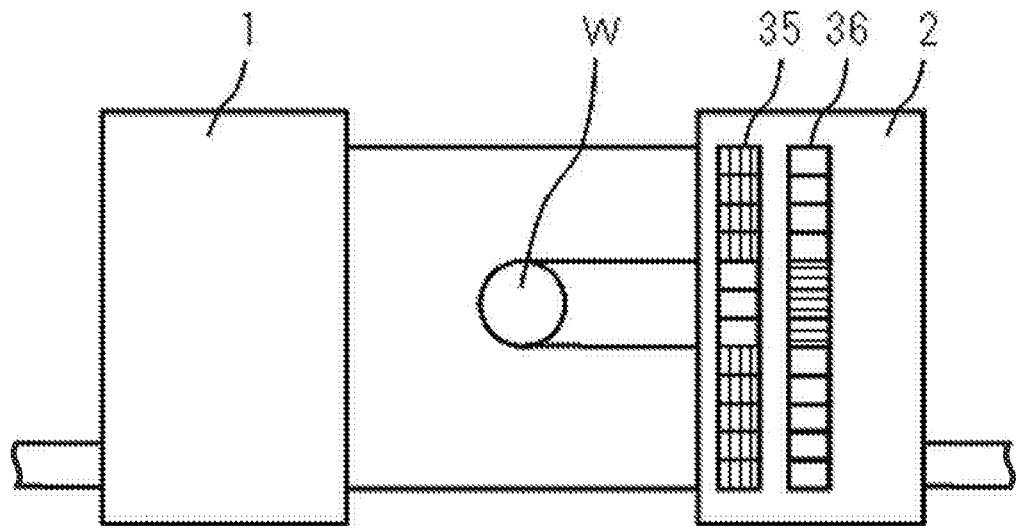
FIG. 13 is a diagram showing an example of an illumination pattern of an incident light position display unit 35 and a measurement position display unit 36 in a second embodiment.

FIG. 13 is a schematic view showing still another embodiment of a display unit 34 provided in an optical receiver 2. As shown in FIG. 13, a display unit 34 of the present embodiment is provided with an incident light position display unit 35 and a measurement position display unit 36, both of which include a plurality of LEDs and arranged in parallel on an extension of a dimension measuring range.

In respective LEDs constituting the incident light position display unit 35, LEDs corresponding to a pixel position of the CCD 29, on which parallel light is incident and is not light-shielded by an object to be measured, are turned on. On the other hand, in the respective LEDs constituting the measurement position display unit 36, LEDs corresponding to a measuring area corresponding to a set operation mode, that is, an actually obtained measured value, are turned on. In an example shown in FIG. 13, a light shielding width measurement mode is selected as an operation mode, and the distance from one end of a dimension measuring range to a second edge position is outputted as the measured value. With such a configuration, an area light-shielded by the object to be measured and an actually measured area can be confirmed at the same time. Furthermore, it is possible to avoid confusion of a user by making respective luminescent colors different, for example, a luminescent color of the incident light position display unit 35 is set to red and the luminescent color of the measurement position display unit 36 is set to green.

Figure 14:
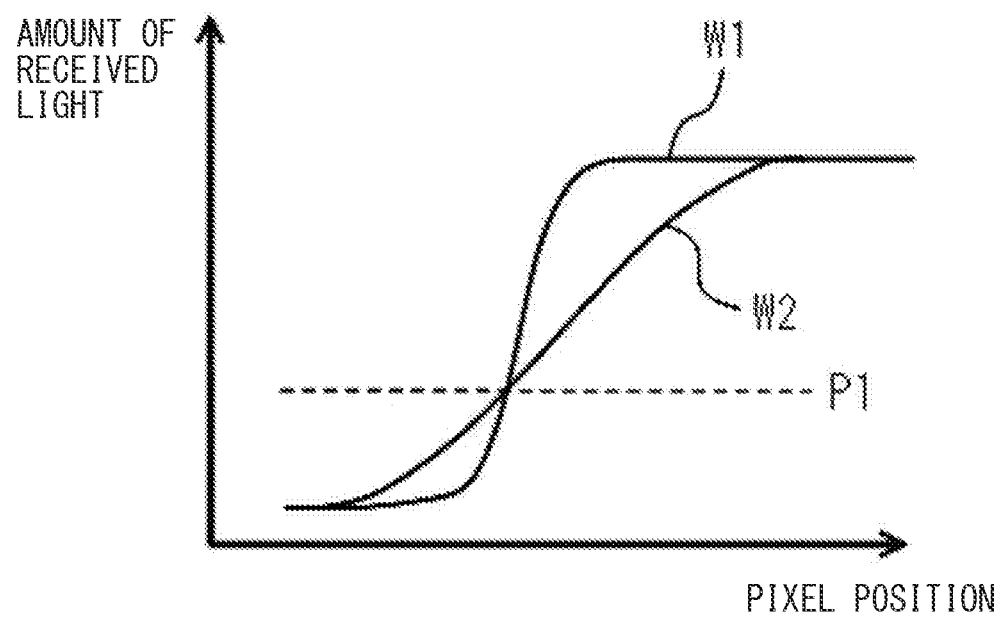
FIG. 14 is a graph showing a distribution of an amount of received light when a relative distance between a projector 1 and an optical receiver 2 is different.

Next, detailed description will be made in reference to a setting of a measuring threshold P1 which is for detecting an edge position. Generally, the measuring threshold P1 of a transmissive dimension measuring device is set to a height position at which an amount of received light is 25% with respect to an amount of received light in a non-light shielding state. FIG. 14 is a graph in which a distribution of an amount of received light W1 shows a distribution of an amount of received light in the case where a projector 1 and an optical receiver 2 are arranged relatively closely, and a distribution of an amount of received light W2 shows a distribution of an amount of received light in the case where the projector 1 and the optical receiver 2 are arranged relatively separately. As shown in FIG. 14, an intersection point of the distributions of the amount of received light W1 and W2 substantially coincides with the measuring threshold P1 (25%). This means that the same pixel position can be detected as an edge position without depending on a relative distance in which the projector 1 and the optical receiver 2 are installed. Therefore, in the case where the measuring threshold P1 is set to the above-described 25% point, the same edge position can be always measured without depending on the relative distance between the projector 1 and the optical receiver 2; and therefore, the measuring threshold P1 is generally fixed at a height position at which the amount of received light is 25% in the non-light shielding state.

In the present embodiment, the height position of the measuring threshold P1 is changeable. Therefore, in the case where the measuring threshold P1 is changed, a deviation is likely to be generated at an edge position which is slightly detected depending on the relative distance between the projector 1 and the optical receiver 2. However, in the case of the measuring threshold P1 which is set at the 25% position according to a use environment of a user or a transparency level of the object to be measured, originally there is a case where only the edge position of the object to be measured cannot be detected.

Figure 15:
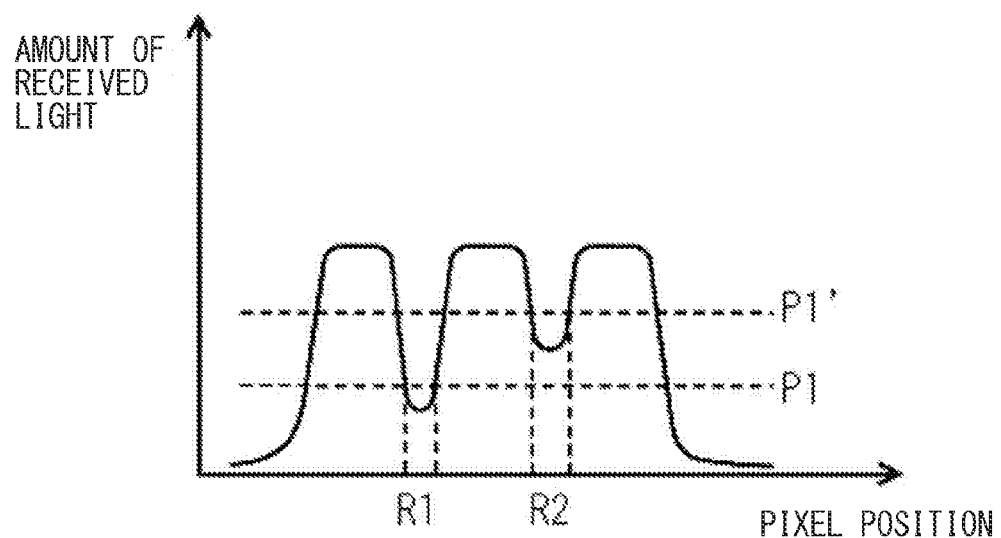
FIG. 15 is a graph showing a relationship between a distribution of an amount of received light in measuring a transparent body and a measuring threshold P1.

For example, in the transmissive dimension measuring device, an object to be measured having high transparency is sometimes measured. In such a highly transparent object to be measured, light of a light shielding area is incident on the optical receiver 2 to some extent; and therefore, an edge position which is for measuring dimension cannot be appropriately detected. FIG. 15 is a graph showing an example of a distribution of an amount of received light outputted from the CCD 29. A lateral axis shows a pixel arrangement position of the CCD 29 and a longitudinal axis shows an amount of light received by each pixel. Furthermore, R1 is a light shielding area by a nontransparent body and R2 is a light shielding area by a transparent body. As shown in FIG. 15, a light shielding area due to a nontransparent body can be detected at the measuring threshold P1; however, a light shielding area R2 due to a transparent body cannot be detected at the measuring threshold P1. Consequently, the measuring threshold P1 is changed to P1' that is higher than P1; and accordingly, the light shielding area due to the transparent body can be surely detected as the edge position.

Figure 16:
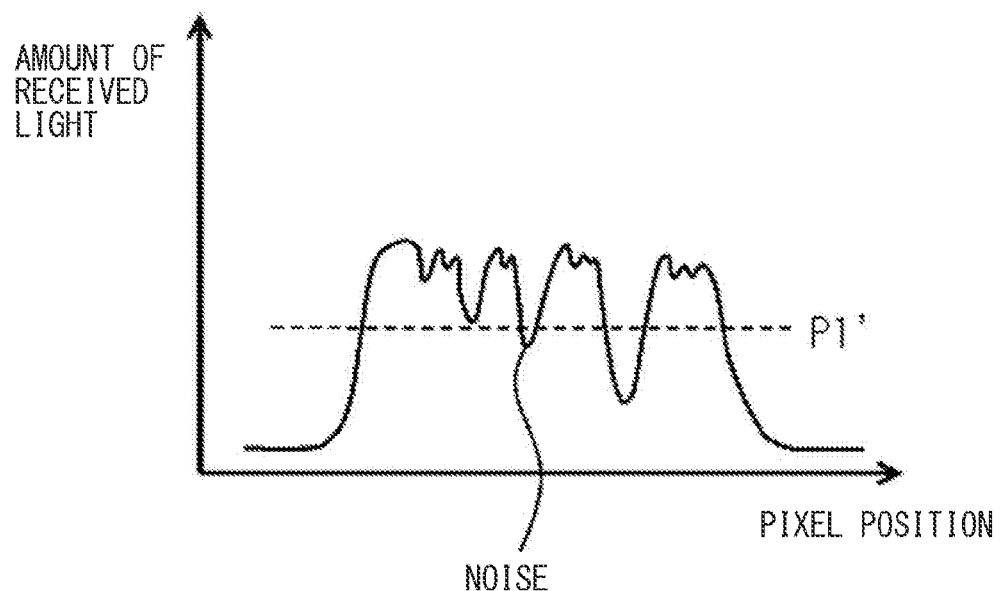
FIG. 16 is a graph showing a relationship between a distribution of an amount of received light under a use environment where there are a lot of noise causes and a measuring threshold P1.

However, if the measuring threshold P1 is set excessively high, as shown in FIG. 16, noise is falsely detected under a use environment where there are a lot of noise causes. FIG. 16 is a graph showing an example of a distribution of an amount of received light in the case where a pixel position in which an amount of received light is reduced due to noise is falsely detected at the measuring threshold P1' as the edge position. In such a case, the measuring threshold P1' needs to be further changed to a lower value that is not influenced by the noise.

In the present embodiment, the measuring threshold P1 can be changed according to a use environment (noise causes) of a user and a transparency level of an object to be measured; and therefore, if the measuring threshold P1 is appropriately set, the measuring threshold P1 is not influenced by noise, and edge positions of objects to be measured having various transparency levels can be detected. A deviation is likely to be generated at the edge position by changing the measuring threshold P1; however, such a slight positional deviation does not become problematic according to a user's request for accuracy (width of a tolerance range). Furthermore, after a relative distance relationship between the projector 1 and the optical receiver 2 is once fixed, in many cases, a change is not often made. Therefore, even if a measured value is slightly diverged from an actual value, a measured value itself does not fluctuate. For example, in the case where OK/NG determination is performed based on a fluctuation width from a measured value of an object to be measured in which dimensional accuracy is assured, a deviation of this edge position is not a problem at all.

Figure 17A:
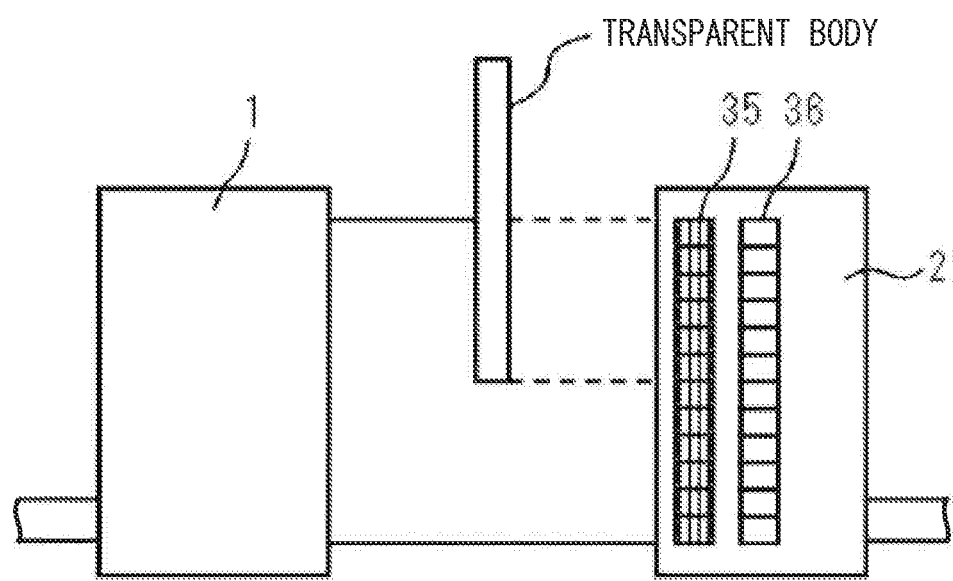
FIGS. 17A and 17B are diagrams each showing a change in illumination pattern of the incident light position display unit 35 and the measurement position display unit 36 when the measuring threshold P1 is changed in measuring a transparent body.
Figure 17B:
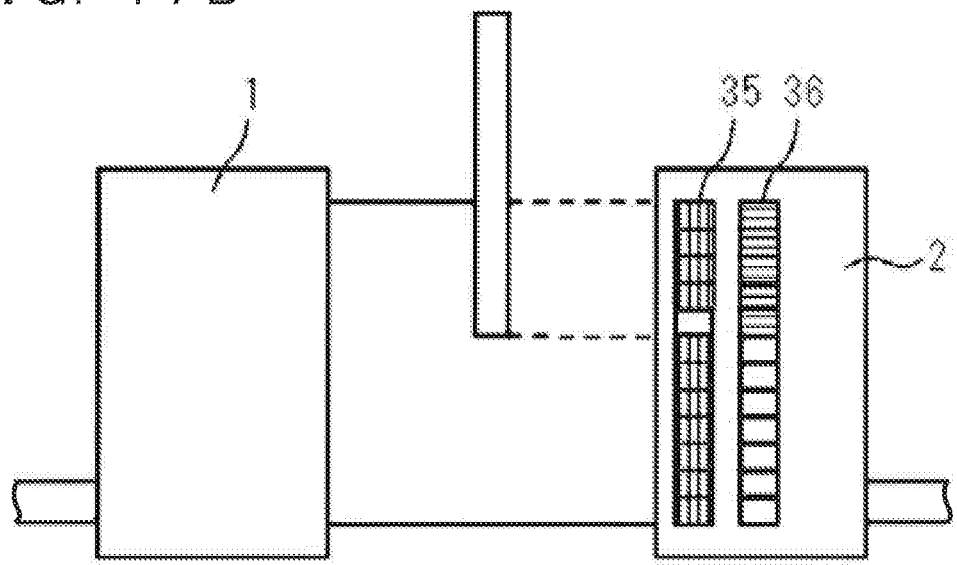

FIGS. 17A and 17B are schematic views each showing an illumination pattern of an incident light position display unit 35 and a measurement position display unit 36 in the case where an object to be measured is a transparent body. FIG. 17A shows an example of a case where less light is light-shielded by a transparent body and an edge position of the transparent body is not appropriately detected. In this state, the incident light position display unit 35 is completely turned on and the measurement position display unit 36 is completely turned off; and a user can confirm that the edge position of the transparent body to be measured is not detected by the setting of the current measuring threshold P1. FIG. 17B is a schematic view showing an illumination pattern of the incident light position display unit 35 and the measurement position display unit 36 in the case where SW 44 provided in a controller 3 is operated and the measuring threshold P1 is changed to a value that is higher than P1. It is found that the measuring threshold P1 is changed; and accordingly, the measurement position display unit 36 corresponding to a light shielding area is turned on in an operation mode which measures a light shielding width and an edge position of the transparent body can be detected. It should be noted that the present embodiment shows an example of a case where an incident light display threshold P2 which makes the incident light position display unit 35 to turn on is the same as the measuring threshold P1; and therefore, the incident light position display unit 35 turns off a light shielding area portion.

As described above, in the present embodiment, in the case where the measuring threshold P1 needs to be changed, the measuring threshold P1 can be changed while confirming the incident light position display unit 35 and the measurement position display unit 36; and therefore, the measuring threshold P1 can be easily appropriately set.

Figure 18:
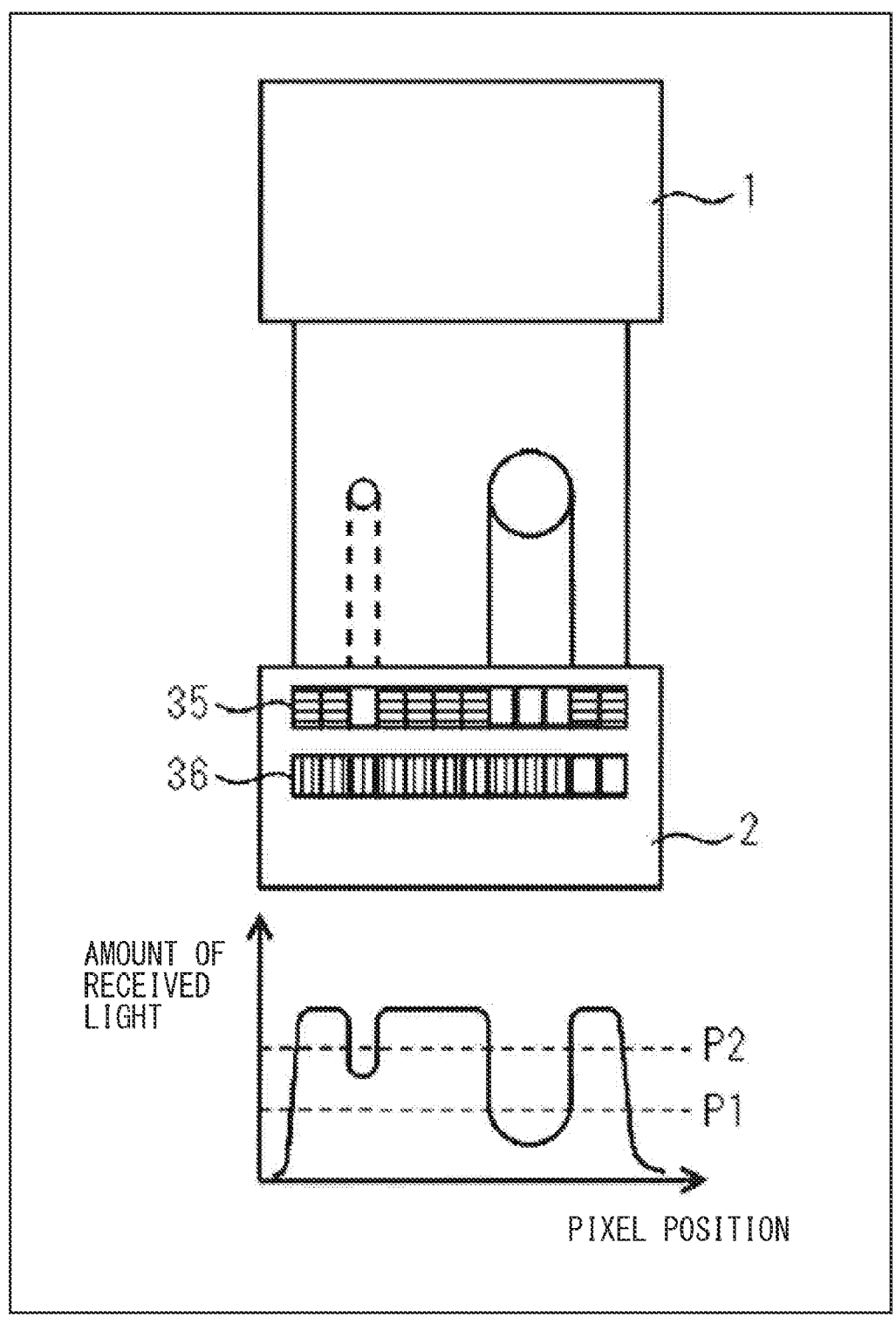
FIG. 18 is a comparison diagram of distributions of an amount of received light of the incident light position display unit 35 and the measurement position display unit 36 provided on the optical receiver 2.

The incident light display threshold P2 which is for turning on the incident light position display unit 35 may be the same as the measuring threshold P1, or may be different from the measuring threshold P1. FIG. 18 is a comparison diagram of distributions of an amount of received light of an incident light position display unit 35 and a measurement position display unit 36 provided on an optical receiver 2. In the example shown in FIG. 18, there is shown an example of the case where an incident light display threshold P2 which is for turning on the incident light position display unit 35 is set differently from a measuring threshold P1. An amount of received light of a light shielding area which is light-shielded by an object to be measured is lower than the measuring threshold P1 and the incident light display threshold P2. On the other hand, the amount of received light of the light shielding area due to dust is lower than the incident light display threshold P2, but is not lower than the measuring threshold P1; and therefore, the incident light position display unit 35 corresponding to the light shielding area due to dust is turned off, but is not detected as a measuring edge position. Therefore, the light shielding area due to dust is not reflected at all on an illumination pattern and a measured value of the measurement position display unit 36. As described above, the incident light display threshold P2 is set to a higher value than the measuring threshold P1; and accordingly, reduction in the amount of received light due to dust and contamination and its specific portion can be known before an abnormal measured value is outputted. Therefore, a user can perform maintenance at an appropriate time.

In the present embodiment, a plurality of LEDs constituting the incident light position display unit 35 and a plurality of LEDs constituting the measurement position display unit 36 are arranged in a double line, but is not necessarily arranged in such a manner; and both functions of the incident light position display unit 35 and the measurement position display unit 36 can be included in a plurality of LEDs arranged in a line in the dimension measuring direction. FIG. 19 is a diagram showing a modified embodiment of a display unit 42. In an example shown in FIG. 19, an LED which emits two colors; for example, an LED corresponding to an incident light area is made to emit red light and a measuring area corresponding to an operation mode is made to turn on in green which is a different color from the incident light area. In the example shown in FIG. 19, an outer diameter measurement mode which measures between an initial edge position and a final edge position counted from one end of a dimension measuring range is selected. Furthermore, a first display pattern mode which makes an LED corresponding to the incident light area turn on and a second display pattern mode which makes an LED corresponding to the measuring area turn on are provided; and these modes may be switched. In this case, for example, these modes may be switched so as to set to the first display mode in optical axis adjustment and to the second display mode in normal measurement. Furthermore, the second display mode can be set only in setting the operation mode.

All of the above-described embodiments show examples in which the display unit 42 is provided in the optical receiver 2; however, it is to be understood that the display unit 42 may be provided in the projector 1. In this case, a light receiving state in the optical receiver 2 is communicated to the projector 1 via the controller 3; and accordingly, the same display can be made in the projector 1. Furthermore, the display unit 42 can be provided in both the projector 1 and the optical receiver 2. Further, the present invention is not limited to the CCD method as the principle of operation, but can also be applicable to the above-described transmissive dimension measuring instrument employing the scanning method. The present invention is not limited to only the embodiments described herein and various modifications and changes may be implemented without departing from the spirit or scope of the present invention as need arises.

What is claimed is:

1. A transmissive dimension measuring device comprising:
a projector which projects light; and
an optical receiver which is arranged with a predetermined interval to the projector, and receives light from the projector,
the transmissive dimension measuring device measuring dimensions of an object to be measured passing between the projector and the optical receiver based on a change in amount of received light received by the optical receiver,
the projector including:
a substantially rectangular solid shaped projector housing provided therein with a light emitting element which emits light and a light projecting lens which converts light emitted by the light emitting element to parallel light; and
a light projecting slit which has a shape with a predetermined width in a dimension measuring direction as a direction substantially horizontal to a bottom surface of the projector housing, from which the parallel light is emitted,
the optical receiver including:
a substantially rectangular solid shaped optical receiver housing provided therein with a light receiving element which receives light; and
a light receiving slit which has a shape with a predetermined width in a dimension measuring direction as a direction substantially horizontal to a bottom surface of the optical receiver housing, on which the parallel light is incident, the transmissive dimension measuring device comprising:
an incident light position display unit which is arranged on at least one side of the projector and the optical receiver in the dimension measuring direction, includes a plurality of indicating lamps each displaying a light receiving state in each area that divides a predetermined width in the dimension measuring direction of the light receiving slit, and displays a position on which the parallel light is incident to the optical receiver.

2. The transmissive dimension measuring device according to claim 1, wherein
the light receiving slit is provided on one side surface substantially vertically arranged in a standing condition from the bottom surface of the optical receiver housing,
the incident light position display unit is provided on an upper surface side opposite to the bottom surface of the optical receiver housing so that a width in the dimension measuring direction of the incident light position display unit is substantially the same as a width of a dimension measuring area, and
the plurality of indicating lamps are each turned on or turned off based on an amount of received light with respect to the each area.

3. The transmissive dimension measuring device according to claim 1, further comprising an operation mode setting unit which accepts settings of a plurality of operation modes for selecting a measuring area to be outputted as a measured value based on a light shielding position of the parallel light due to the object to be measured, wherein
the measured value corresponding to the operation mode set by the operation mode setting unit is outputted.

4. The transmissive dimension measuring device according to claim 3, further comprising a measurement position display unit including a plurality of indicating lamps arranged along with the incident light position display unit, wherein
the measurement position display unit is configured so that an indicating lamp corresponding to the measuring area to be outputted as the measured value is turned on or turned off in response to the operation mode set by the operation mode setting unit.

5. The transmissive dimension measuring device according to claim 3, wherein
the incident light position display unit is configured so that the indicating lamp corresponding to the measuring area to be outputted as the measured value is turned on in a display mode different from a display mode of the indicating lamp located in an incident light position of the parallel light in response to the operation mode set by the operation mode setting unit.

6. The transmissive dimension measuring device according to claim 1, wherein
a threshold of the amount of received light received by the light receiving element which is for making each of the indicating lamps of the incident light position display unit turn on is set higher than a threshold of an amount of received light which is for detecting an edge position serving as a reference of dimension measurement.

7. The transmissive dimension measuring device according to claim 1, further comprising
an optical axis adjustment mode setting unit which accepts a setting of an optical axis adjustment mode for making optical axes of the projector and the optical receiver coincide, wherein
the incident light position display unit is switched to a display mode for displaying a peak position of an amount of received light received by the light receiving element when the optical axis adjustment mode is set.

8. The transmissive dimension measuring device according to claim 1, further comprising
an optical axis coincidence display unit which shows whether or not the optical axes in the dimension measuring area of the projector and the optical receiver coincide with at least one of the projector and the optical receiver.

9. The transmissive dimension measuring device according to claim 1, wherein
an inclined portion is formed at least one of a corner portion of an upper surface opposite to the bottom surface of the projector and a front surface formed with the light projecting slit, and a corner portion of an upper surface opposite to the bottom surface of the optical receiver and a front surface formed with the light receiving slit, and
the inclined portion being formed with the incident light position display unit.

* * * * *